United States Patent [19]

Matson

[11] Patent Number: 4,785,926
[45] Date of Patent: Nov. 22, 1988

[54] CLUTCH/BRAKE

[75] Inventor: Robert C. Matson, Waukesha, Wis.

[73] Assignee: Industrial Clutch Corporation, Waukesha, Wis.

[21] Appl. No.: 38,867

[22] Filed: Apr. 15, 1987

[51] Int. Cl.⁴ ............................................. F16D 67/04
[52] U.S. Cl. .................................... 192/18 A; 192/15; 192/85 AA; 192/110 B
[58] Field of Search ...................... 192/12 C, 15, 18 R, 192/18 A, 85 A, 85 AA, 110 B

[56] References Cited

U.S. PATENT DOCUMENTS

| | | | |
|---|---|---|---|
| 2,095,094 | 10/1937 | Glasner | 192/85 AA X |
| 2,242,396 | 5/1941 | Johansen | 192/18 A |
| 2,402,052 | 6/1946 | Johansen | 192/18 A |
| 2,584,191 | 2/1952 | Danly et al. | 192/18 A X |
| 2,838,150 | 6/1958 | Eason | 192/18 A |
| 2,890,773 | 6/1959 | Martindell | 192/18 A |
| 2,909,255 | 10/1959 | Chung | 192/85 AA X |
| 3,209,872 | 10/1965 | Moyer et al. | 192/18 A X |
| 3,638,773 | 2/1972 | Lewis et al. | 192/18 A |
| 3,653,477 | 4/1972 | Hansen | 192/113 B |
| 3,667,581 | 6/1972 | Hanks | 192/18 A |
| 3,698,898 | 10/1972 | Sommer | 192/18 A |
| 3,713,517 | 1/1973 | Sommer | 192/18 A |
| 3,835,971 | 9/1974 | Spanke et al. | 192/18 A |
| 3,896,911 | 7/1975 | Beneke | 192/18 A |
| 3,924,715 | 12/1975 | Cory | 192/18 A |
| 3,946,840 | 3/1976 | Sommer | 192/18 A |
| 4,116,322 | 9/1978 | Ashfield | 192/48.8 |
| 4,122,926 | 10/1978 | Spanke et al. | 192/18 A |
| 4,135,611 | 1/1979 | Spanke | 192/18 A |
| 4,234,123 | 11/1980 | Cory | 233/23 R |
| 4,317,512 | 3/1982 | Sato | 192/85 AA |
| 4,440,278 | 4/1984 | Weber | 192/18 R |
| 4,512,450 | 4/1985 | Babcock | 192/12 R |
| 4,534,454 | 8/1985 | Brooks | 192/18 A |
| 4,552,255 | 11/1985 | Sommer | 192/18 A |
| 4,562,907 | 1/1986 | Maeda | 192/18 A |
| 4,574,926 | 3/1986 | Bubak | 192/18 A |
| 4,589,533 | 5/1986 | Del Duca | 192/18 A |
| 4,630,718 | 12/1986 | Hanks | 192/18 A |
| 4,633,986 | 1/1987 | Matson | 192/18 A |

Primary Examiner—Leslie A. Braun
Assistant Examiner—Richard M. Lorence
Attorney, Agent, or Firm—Quarles & Brady

[57] ABSTRACT

A clutch/brake for alternatively connecting a rotatably driven shaft to a driving member and a stationary member has clutch plates operatively connecting the driven shaft and the driving member and brake plates operatively connecting the driven shaft and the stationary member. A clutch operator for urging the clutch plates together is connected to rotate with the driving member. A brake operator for urging the brake plates together is connected to rotate with the driven shaft. A linkage connects the clutch and brake operators to move axially together and includes a bearing which transmits axial thrust loads statically when the clutch is engaged. An annular pneumatic piston moves the clutch and brake operators in a first axial direction to engage the clutch, is connected to the outer bearing race and rotates with the driving member. Brake springs bias the clutch and brake operators in a second axial direction opposite to the first axial direction to engage the brake and are connected to the inner bearing race. A second bearing connects the driven shaft and the housing and is statically loaded with the force of the brake springs when the clutch is engaged. A force exerted by the piston is transmitted through the linkage bearing in the first axial direction to disengage the brake and a force exerted by the biasing means is transmitted through the bearing in the second axial direction to disengage the clutch.

9 Claims, 1 Drawing Sheet 4,785,926

CLUTCH/BRAKE

BACKGROUND OF THE INVENTION

This invention relates to an oil-immersed clutch/brake mechanism for a machine requiring start-stop operation, and is particularly useful for mechanical presses.

Many prior art clutch/brake mechanisms mount the components with the actuating mechanism on the driven shaft, which adds considerably to the inertia which must be started and stopped. This wastes energy and generates large amounts of heat which must be dissipated to maintain acceptable operating temperatures. In addition, the brake must be oversized to stop the added inertia within acceptable stopping angles and times.

An exception to the above-described prior art is shown in Matson U.S. Pat. No. 4,633,986, which has an actuating mechanism mounted to rotate with the driving portion. However, in this arrangement, the bearings are loaded dynamically under axial thrust, which requires appropriately sized bearings and also generates additional heat.

To take advantage of a permissible small size and multiplicity of oil-immersed friction surfaces, brake and clutch engagement forces are considerable. Since most units' actuating mechanisms are carried on the driven shaft, a small piston diameter is desirable to generate the clutch engagement force. One way to attain this employs high pressure hydraulics as an actuating medium. However, low pressure pneumatics are ordinarily applied for machine operation. Hydraulic actuation requires an additional power source for hydraulic pressure which is not commonly available in a plant environment.

Some prior art devices have employed pneumatic actuation to overcome the expense and complexity of hydraulic actuation. Because the pneumatic pressures normally available in industrial environments are in the 60–90 PSIG range, the piston area must be increased considerably over that of hydraulic pistons to produce a sufficient actuating force. This requires a piston diameter far in excess of the smallest necessary friction disc diameter. Therefore, current designs usually compromise by reducing the number of friction discs and making them larger in diameter to accommodate the required pneumatic piston diameters. This results in an inefficient design and adds greatly to the driven inertia.

SUMMARY OF THE INVENTION

This invention provides a clutch/brake for alternatively connecting a rotatably driven shaft to a driving member and a stationary member. Clutch plates operatively connect the driven shaft and the driving member and brake plates operatively connect the driven shaft and the stationary member. A clutch operator for urging the clutch plates together is connected to rotate with the driving member. A brake operator for urging the brake plates together is connected to rotate with the driven shaft. A linkage connects the clutch and brake operators to move axially together and includes a bearing which is static when the clutch is engaged. Actuating means moves the clutch and brake operators in a first axial direction and rotates with the driving member. Biasing means urge the clutch and brake operators in a second axial direction opposite to the first axial direction. The first exerted by the actuating means is transmitted through the bearing in the first axial direction to move one of the operators and the forced exerted by the biasing means is transmitted through the bearing in the second axial direction to move the other of the operators. In this construction, the bearing is capable of transmitting high axial loads and does not generate excessive heat unlike prior art designs in which the bearing is loaded dynamically.

In a preferred form, a bearing rotatably connects the driven shaft and the housing. This bearing also is subjected statically to the axial thrust load produced by the biasing means when the clutch plates are engaged. Thus, this bearing can also transmit a high thrust load without the energy loss and heat gain associated therewith. This construction also eliminates thrust loads which would otherwise be transmitted externally from the clutch/brake.

In an especially useful form, the actuating means is an annular piston and the bearing connecting the driven shaft and the housing is radially interior of the piston. The piston can be made relatively large because it rotates with the driving member to allow positioning the bearing inside of it, which results in an axially compact design. The large size of the piston also enables forces sufficient to employ small diameter clutch and brake plates using pneumatic pressures which are normally available.

In an especially preferred form, biasing means transmit a preload force in the first axial direction to the bearing connecting the clutch and brake operators. The biasing means may also be positioned so as to act between the housing and the driven shaft through the linkage bearing to also subject the bearing between the housing and the driven shaft to a preload. Therefore, these bearings are subjected to a desirable relatively small preload force when the brake is engaged.

Therefore, it is a principal object of this invention to provide an energy efficient clutch/brake.

It is another important object of this invention to provide a low pressure actuated clutch/brake which wastes a minimum amount of energy.

It is another object of this invention to provide a clutch/brake in which the bearings are not subjected to dynamic thrust loads.

It is another object of this invention to provide a clutch/brake which doest not produce external thrust loads.

It is another object of this invention to provide a radially and axially compact clutch/brake.

These and other objects and advantages of the invention will become apparent from the following detailed description and from the drawings.

DETAILED DESCRIPTION OF THE PREFERRED EMBODIMENT

Figure 1:
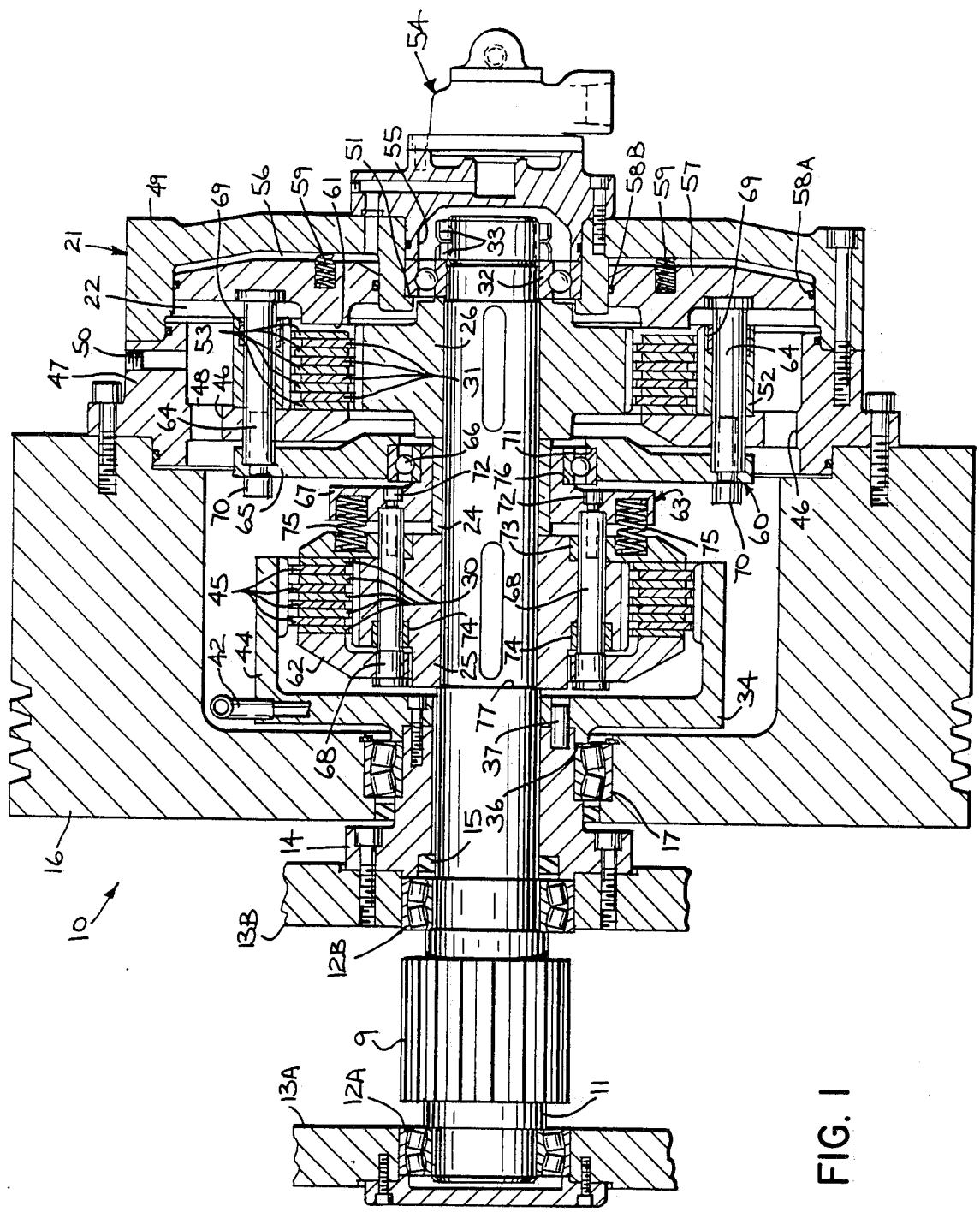
FIG. 1 is an elevational view in section of a preferred embodiment of a clutch/brake of the present invention.

Referring to the drawings, a clutch/brake apparatus generally referred to as 10 has a driven shaft 11 journaled in antifriction bearings 12A and 12B to rotate relative to machine frame stationary members 13A and 13B. The driven shaft 11 has a pinion 9 formed thereof for driving a machine, such as a mechanical press, and extends through a hollow quill shaft support 14 which is bolted to the stationary member 13B and is sealed against the shaft 11 by a seal 15. The quill shaft support 14 mounts a flywheel driving member 16 on an antifriction bearing 17, which is capable of bearing thrust and axial loads. Such bearings include the spherical roller bearing shown, tapered roller bearings, ball bearings, and some types of hydrodynamic bearings.

A housing generally referred to as 21 is bolted to the flywheel driving member 16 and, together with the driving member 16, defines a sealed radial cavity 22 which is filled with a cooling and lubricating oil. The driven shaft 11 extends into the radial cavity 22 and is shrink-fitted, splined, pinned, keyed or otherwise securely attached to a brake driven hub 25, a bushing spacer 24, and a clutch driven hub 26 to prevent rotation of the three aforementioned parts relative to the driven shaft 11. Since the bushing spacer 24, the brake driven hub 25, and the clutch driven hub 26 all rotate together with the shaft 11, two or more of these parts could be made in one piece as a single unit.

A first set of brake plates 3 are mounted on the brake driven hub 25 and a first set of clutch plates 31 are mounted on the clutch driven hub 26. The brake and clutch plates 30 and 31 are made of material which is suitable for transmitting the required torsional loads and are axially splined to the brake and clutch driven hubs 25 and 26, respectively. The axial spline connections between the brake and clutch plates and the corresponding hubs allow the brake and clutch plates 30 and 31 to move axially but not rotationally relative to their respective brake and clutch driven hubs 25 and 26.

The inner race of a ball bearing 32 is held on the end of the driven shaft 11 by locknuts 33 or other suitable means. The inner race abuts the end of the clutch driven hub 26 to apply an axial compressive force to the spacer 24 and to the brake and clutch driven hubs 25 and 26 to insure against any movement of the three aforementioned elements relative to the driven shaft 11 or to each other. This arrangement, among others, is adequate to retain the brake and clutch driven hubs 25 and 26, the spacer 24 and the bearing 32 inner race securely on the shaft 11.

The quill shaft support 14 extends slightly into the radial cavity 22 and is bolted to an annular mounting member 34. The mounting member 34 has an annular land 36 which abuts the inner race of the bearing 17. Pins 37 insure against rotation of the mounting member 34 relative to the quill shaft support 14.

A pitot tube oil pick-up 42 is mounted on the outer circumference of the mounting member 34 and is in fluid communication with external cooling means (not shown) by means of suitable oil passageways (not shown) in the mounting member 34. See, for example, Matson U.S. Pat. No. 4,633,986, issued Jan. 6, 1987, the entire disclosure of which is hereby incorporated by reference.

The mounting member 34 has an integral axially extending ring portion 44. A second set of brake plates 45 made of a suitable material is interleaved with the first set of brake plates 30 and is axially splined to the inside circumference of the ring portion 44 to move freely axially but not rotationally relative to the ring portion 44. Brake plates 30 are at the ends of the stack of the brake plates 30 and 45.

The housing 21 includes a side section 47 which is bolted and sealed to the flywheel 16 and has a radially inwardly extending flange 48. The housing 21 also includes an end section 49 which is bolted and sealed to the side section 47. A hole 50 is provided in the side section 47 for filling the cavity 22 with oil and is tapped to receive a plug (not shown). Holes 46 are also provided through the flange 48 to allow free passage of cooling and lubricating oil.

A second annular ring member 52 is bolted to the flange 48. A second set of clutch plates 53 made of a suitable material is interleaved with the first set of clutch plates 31 and is axially splined to the inside circumference of the second ring member 52 to be axially but not rotationally movable relative to the second ring member 52. Clutch plates 53 are on the ends of the stack of the clutch plates 31 and 53 and the radially inner periphery of the flange 48 abuts the end one of the clutch plates 53 adjacent to the flange 48.

A rotary union 54 is bolted to the end face of the end section 49 and has an inwardly extending lip 55 which compresses the outer race of bearing 32 against a shoulder 51 in the end section 49 and seals off a central opening in the face of the end section 49. The rotary union 54 is in fluid communication with an annular cylinder 56 defined by the inside wall of the end section 49 radially outside of the bearing 32 to provide compressed air to the cylinder while the housing 22 is rotating. An actuator in the form of an annular piston 57 is freely slidable in the cylinder 56 and sealed thereto by piston seals 58A and 58B. Preload compression springs 59 bias the piston in a first axial direction toward the clutch plates 31 and 53 when the clutch is disengaged.

An operator assembly 60 includes a clutch operator 61 which is formed as an integral part of the piston 57. The operator assembly also includes a brake operator 62 and a linkage 63 connecting the clutch and brake operators.

The linkage 63 includes push rods 64, a push plate 65, an anti-friction bearing 66, a pull plate 67, and pull rods 68. The push rods 64 have one end secured to the piston 57 and are journalled by bushings 69 in the ring member 52. Cap screws 70 secure the push plate 65 to the ends of the push rods 64 extending beyond the flange 48. The outer race of the bearing 66 is pressed into the push plate 65 and abuts a shoulder 71 of the push plate 65.

The inner race of the bearing 66 is pressed onto and against a shoulder 76 of the pull plate 67. The pull plate 67 is slidable on the bushing spacer 24 and is secured to the ends of the pull rods 68 by cap screws 74. The pull rods 68 extend through a brake back plate 73 which is bolted to the brake driven hub 25 and through the brake driven hub 25 in which the pull rods 68 are journalled by bushings 74. The pull rods 68 are pressed into or otherwise secured to the brake operator 62. Brake compression springs 75 between the brake back plate 72 and the pull plate 67 bias the entire operator assembly 60 in a second axial direction so that the brake is normally engaged and the clutch is normally disengaged when the cylinder 56 is not pressurized.

In operation, the flywheel driving member 16 is continuously driven by a prime mover, such as an electric motor (not shown), and, because of its relatively great mass, stores considerable rotational energy. The housing 21, the piston actuator 57, the second ring member 52, the second set of clutch plates 53, the clutch operator 61, the push rods 64 and the push plate 65 all rotate with the flywheel 16 adding appreciably to the rotating mass and therefore to the rotational energy stored. It is noted that the flywheel can be made hollow as shown to partially house the internal components of the clutch/brake for an axially compact design. This can be done without significantly increasing the diameter of the flywheel to increase the driving mass, because the housing 21, the piston actuator 57, the second ring member 52, the second set of clutch plates 53, the clutch operator 61, the push rods 64 and the push plate 65 contribute to the driving mass.

Normally, when the cylinder 56 is not pressurized, the springs 75 exert a considerable force to compress the brake plates 30 and 45 together, and which also moves the piston 57 away from the clutch plates 31 and 53 against the force of the preload springs 59. The preload springs effectively act between the housing 21 and the driven shaft 11 through the bearing 66 to insure that a desirable small axial force is applied to bearings 66 and 32. When the brake is engaged, the driven shaft 11 is not rotating and the driving member is rotating. The outer races of the bearings 32 and 66 are therefore rotating with respect to the inner races so that the bearings can be said to be in a dynamic state. However, no axial loads, except the desirable relatively small preload force exerted by springs 59, are being transmitted by the bearings 32 and 66. The force of brake springs 75 is contained between the brake operator 62 and the brake back plate 73 while compressing brake plates 30 and 45 together thereby exerting no external axial force to the driving and driven members when the brake is engaged.

When the cylinder 56 is pressurized, thereby engaging the clutch and disengaging the brake, the bearings 32 and 66 momentarily transmit the reaction force of the springs 75 dynamically while the driven shaft 11 is accelerating up to the speed of the driving member 16. However, once the clutch is fully engaged, the speed of the driven shaft 11 equals the speed of the driving member 16 so that the bearings 32 and 66 are statically loaded, meaning that there is no relative speed between the inner and outer races. In this state, bearings 32 and 66 are loaded axially with the reaction force of the springs 75.

The clutch engagement force is equal to the sum of the preload springs 59 force and the cylinder 56 pressurization force less the force from the brake springs 75 and the centrifugal hydraulic force from the oil rotating in the housing 21. All axial forces produced by the clutch/brake 10, except the force from the brake springs 75, are contained within the housing 21, thereby exerting no external force into the driving or driven members when the clutch is engaged. When the clutch is engaged, the force from the brake springs 75 tends to thrust the brake hub 25 in the first axial direction against shoulder 77. The reaction force from the brake springs 75 tends to thrust housing 21 in the second axial direction. However, since bearing 32 is positioned against shoulder 51 in housing 21 and lock nuts 33 on shaft 11, the reaction force of springs 75 is contained in the driven shaft 11 between the shoulder 77 and lock nuts 33 so that no external thrust is transmitted to bearings 12A, 12B and 17. Further, bearing 32 is statically loaded when the clutch is engaged since there is no relative speed between its inner and outer races. The magnitude of the axial forces born by bearings 32 and 66 in this statically loaded condition is therefore equal to the force from brake springs 75.

To insure that the axial load is born by the bearing 32 and not transmitted externally of the clutch/brake 10 to the bearings 12A, 12B and 17, appropriate axial clearances are provided at the bearings 12A and 12B. Bearing 17 positions the clutch/brake 10 and driven shaft 11 in a fixed axial position. By being statically loaded in this way, the bearings 32 and 66 are capable of much larger thrust loads than when they are dynamically loaded and do not produce unwanted heat.

The piston 57 is of a relatively large diameter to provide an actuation force using pneumatic pressures normally available in industrial environments (60–90 psig) which is sufficient to overcome the brake springs 75 and apply a suitable clutch engagement force. The larger piston, which beneficially adds to the driving inertia, enables force using pneumatic pressure which allow clutch and brake plates of relatively small diameter. The clutch and brake hubs 26 and 25 can also be of relatively small diameter, as can the other components that rotate with the driven shaft 11 such as the brake operator 62, the brake back plate 73, and the pull plate 67. Thus, although these other components rotate with the driven shaft, the inertia they add to the driven shaft is kept to a minimum as a result of the larger forces enabled by the piston.

Numerous modifications to and variations of the preferred embodiment will be apparent to those skilled in the art. Therefore, it is not intended that the invention be limited to the preferred embodiment, but that it be defined by the claims as follows.

I claim:

1. A clutch/brake for alternatively connecting a rotatably driven shaft to a driving member and a stationary member, comprising:
    clutch plates operatively connected respectively to said driven shaft and said driving member;
    brake plates operatively connected respectively to said driven shaft and said stationary member;
    a clutch operator for urging said clutch plates together, said clutch operator being connected to rotate with the driving member;
    a brake operator for urging said brake plates together, said brake operator being connected to rotate with the driven shaft;
    a linkage for connecting the clutch and brake operators to move axially together, said linkage including an anti-friction bearing which is static when the brake plates are fully disengaged and dynamic when the clutch plates are fully disengaged;
    actuating means for moving said clutch and brake operators in a first axial direction, said actuating means being connected for rotation with the driving member; and
    means for biasing the clutch and brake operators in a second axial direction opposite to the first axial direction;
    wherein a force exerted by the actuating means is transmitted through the bearing in the first axial direction to move one of the operators to a fully disengaged position and a force exerted by the biasing means is transmitted through the bearing in the second axial direction to move the other of the operators to a fully disengaged position.

2. A clutch/brake as in claim 1, further comprising:
    means including a bearing rotatably connecting the driven shaft and the driving member, said bearing being subjected statically to substantially all of the axial thrust load produced by the clutch/brake when the clutch plates are engaged.

3. A clutch/brake as in claim 2, wherein the actuating means is a fluid actuated annular piston and the bearing connecting the driven shaft and the driving member is radially interior of the piston.

4. A clutch/brake as in claim 2, wherein preload springs exert a force between the driven shaft and the driving member when the actuating means is not actuated to provide an axial preload on the linkage bearing and on the bearing between the driven shaft and the driving member.

5. A clutch/brake as in claim 1, wherein the bearing has a first race, a second race, and rolling elements between the first and second races, and the actuating means force is transmitted from first race through the rolling elements to the second race and the biasing means force is transmitted from the second race through the rolling elements to the first race.

6. A clutch/brake as in claim 1, wherein the clutch operator is fixed to the actuating means on one side of the bearing, the brake operator, is on the other side of the bearing and the bearing has a first race and a second race, and furhter comprising means connecting the brake operator to one of said races which rotate with the driven shaft and means connecting the clutch operator to the other of said races which rotate with the driving member.

7. A clutch/brake as in claim 1, wherein the biasing means is positioned between the brake plates and the bearing to bias the brake plates fully engaged and the clutch plates fully disengaged.

8. A clutch/brake as in claim 1, wherein biasing means exert a force on the actuating means to transmit a preload force in the first axial direction to the bearing.

9. A clutch/brake as in claim 1, wherein the actuating means is a pneumatically actuated annular piston.

* * * * *